(12) United States Patent
Hyodo et al.

(10) Patent No.: US 6,537,595 B1
(45) Date of Patent: Mar. 25, 2003

(54) CHEWING GUM COMPOSITION

(75) Inventors: Masami Hyodo, Urawa (JP); Keiji Fujimoto, Misato (JP); Shinobu Abe, Ageo (JP); Makoto Tokizane, Omiya (JP)

(73) Assignees: Lotte Co., Ltd., Tokyo (JP); Ogawa & Co., Ltd., Tokyo (JP)

( * ) Notice: Subject to any disclaimer, the term of this patent is extended or adjusted under 35 U.S.C. 154(b) by 175 days.

(21) Appl. No.: 09/661,424

(22) Filed: Sep. 13, 2000

(30) Foreign Application Priority Data

Sep. 17, 1999 (JP) .............................. 11-264226

(51) Int. Cl.[7] ................................................ A23G 3/30
(52) U.S. Cl. ........................................................ 426/3
(58) Field of Search ................................ 426/3, 471, 5

(56) References Cited

U.S. PATENT DOCUMENTS

| 4,588,592 A | 5/1986 | Elias ............................. 426/5 |
| 5,192,563 A | 3/1993 | Patel et al. .................... 426/5 |
| 6,056,949 A | 5/2000 | Menzi et al. ............... 424/76.1 |

FOREIGN PATENT DOCUMENTS

| EP | 0 221 850 | 5/1987 |
| JP | 1181748 | 7/1989 |
| JP | 03155753 | 7/1991 |
| JP | 04036152 | 2/1992 |
| JP | 05041957 | 2/1993 |
| JP | 06054653 | 3/1994 |
| JP | 08080160 | 3/1996 |
| JP | 08154589 | 6/1996 |
| JP | 08173080 | 7/1996 |
| JP | 08294373 | 11/1996 |
| JP | 09047225 | 2/1997 |
| JP | 09065850 | 3/1997 |
| JP | 11269483 | 10/1999 |
| JP | 11319534 | 11/1999 |
| WO | WO 00/36931 | 6/2000 |

OTHER PUBLICATIONS

Tsujimoto Hiroyuki, *Food industry*, 9. 30., issue p. 18–36 (1998), (Feature Article: Food granulation and micro capsule technology).

*Primary Examiner*—Arthur L. Corbin
(74) *Attorney, Agent, or Firm*—Darby & Darby

(57) ABSTRACT

Provided is a chewing gum composition containing a granular flavoring having a bulk density of 0.40 to 0.95 g/cm$^3$ obtained by a fluidized bed layering granulating method using a spray-drying type fluidized bed granulating apparatus which continuously produces spherical granules directly from a liquid raw material, wherein the granular flavoring has a hardness of 0.5 to 1.0 gf/mm$^2$ and an average particle diameter of 50 to 1000 μm and is contained preferably in a proportion of 0.01 to 5% by weight based on the total amount of the chewing gum composition. Obtained is a chewing gum composition in which a flavor component is retarded from eluting and in which a strong flavor persists even after staying in one's mouth for a long time.

2 Claims, 3 Drawing Sheets

(I) Fine particle (nuclear particle) formation (spray-drying)

(II) Growth of nuclear particle (spray granulation + layering granulation)

(III) Product granule formation (a)

(b)

(c)

(d)

CHEWING GUM COMPOSITION

BACKGROUND OF THE INVENTION

1. Field of the Invention

The present invention relates to a chewing gum composition having excellent persistence in a flavor.

2. Description of the Related Art

It has so far been known that when a liquid flavoring is added to a chewing gum, it is taken in the gum base and reduced in generation of a flavor.

Accordingly, a flavoring is added to a chewing gum in a powder form in many cases. Also, a chewing gum stays in a mouth for a fixed time and is requested to provide a tasty flavor during chewing, and therefore a powdery flavoring is required in terms of persistence of a flavor.

Usually, a spray-drying method is a typical example of processes for producing a powdery flavoring with drying a liquid flavoring.

The spray-drying method is a very excellent method, but as shown in FIG. 6 (a), the resulting powder comprises very fine particles and therefore has such defects in handling that it is lacking in fluidity or absorbs moisture in a certain case. Further, the flavor is revealed partially at the beginning of chewing.

In recent years, fine particles obtained by spray-drying are pelletized to granules for the purposes of improving the physical properties and the flavor thereof, and apparatuses provided with a function of fluidized bed granulation in a spray-drying apparatus have been developed.

Granular flavorings produced by these apparatuses are formed by a granulation mechanism of fluidized bed agglomeration and are of an amorphous form having a porous agglomerating structure as shown in FIG. 6 (b). Therefore, while they are improved in physical properties, they have the problem that when they are added to a chewing gum, the flavor is revealed partially at the beginning of chewing and lacking in persistence.

Also, as shown in FIG. 6 (c), granulated flavorings obtained by a wet stirring-granulating apparatus are as well of an amorphous form having a porous agglomerating structure. Therefore, while they are improved in physical properties similarly to the case described above, they have the problem that when they are added to a chewing gum, the flavor is revealed partially at the beginning of chewing and lacking in persistence.

Further, when producing spherical granulates which are dense and have a beautiful appearance as a finished product, an extrusion granulating apparatus is used. As shown in FIG. 6 (d), in this case, cylindrical pellets are once produced and then subjected to a rolling type sphering apparatus to be molded into spherical granules, and they are subjected to finish drying. Accordingly, involved are the problems that a lot of steps are required and that the resulting granules have a too large particle diameter, so that it is inadequate in a certain case to use them as a powder flavoring for a chewing gum.

Accordingly, it is the existing situation that a satisfactory flavoring which is suited to a chewing gum composition as a flavoring having excellent persistence has not yet been obtained and that a chewing gum composition having excellent persistence in a flavor is desired.

The present invention is intended to solve the conventional problems described above, and an object thereof is to provide a chewing gum composition which is retarded a flavor component from eluting in a mouth and reveals a strong flavor even after staying in a mouth for a long time and which has excellent persistence in a flavor.

SUMMARY OF THE INVENTION

Intensive researches repeated by the present inventors in order to solve the conventional problems described above have resulted in finding that a powder flavoring to be added to a chewing gum which comprises firm and dense granules is the most suited to persistence in a flavor and further finding that the granular flavoring is produced by granulating by means of a specific apparatus which can continuously produce spherical granules directly from a liquid raw material, and thus the present invention has been completed.

That is, the present invention comprises the following items (1) to (4):

(1) A chewing gum composition containing a granular flavoring having a bulk density of 0.40 to 0.95 g/cm$^3$ which is obtained by a fluidized bed layering granulating method using a spray-drying type fluidized bed granulating apparatus capable of continuously producing spherical granules directly from a liquid raw material.

(2) The chewing gum composition as described in the above item (1), wherein the granular flavoring has a hardness of 0.5 to 1.0 gf/mm$^2$.

(3) The chewing gum composition as described in the above item (1) or (2), wherein the granular flavoring has an average particle diameter of 50 to 1000 μm.

(4) The chewing gum composition as described in any of the above items (1) to (3), wherein the granular flavoring is contained in a proportion of 0.01 to 5% by weight based on the total amount of the chewing gum composition.

BRIEF DSCRIPTION OF THE DRAWINS

Figure 5:
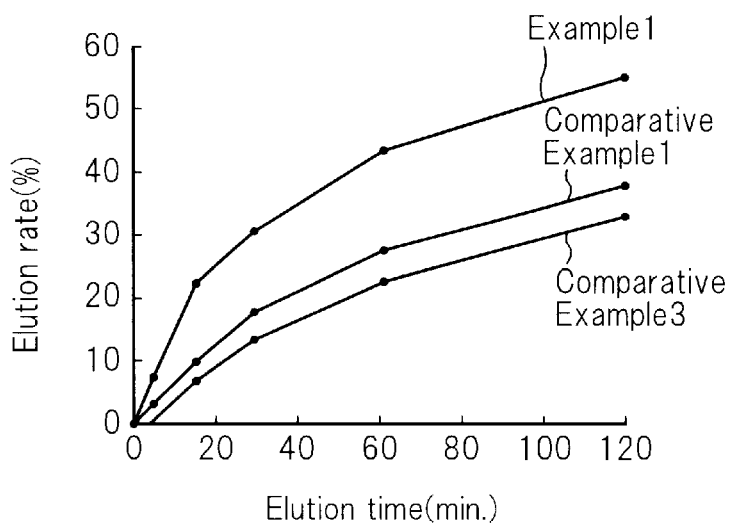
Figure 6:
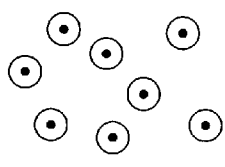
Figure 6:
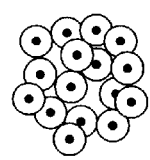
Figure 6:
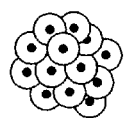
Figure 6:
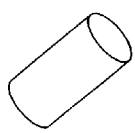

FIG. 5 is a characteristic drawing showing a relation between an elution time (minute) of a flavor component of a plate gum and an elution rate (%) in the examples and the comparative examples FIG. 6 (a) is an explanatory drawing of a granular flavoring obtained by a conventional spray-drying method; (b) is an explanatory drawing of a granular flavoring obtained by means of a conventional fluidized bed agglomeration granulating apparatus; (c) is an explanatory drawing of a granular flavoring obtained by a conventional wet stirring-granulating apparatus; and (d) is an explanatory drawing of a cylindrical granulated product obtained by means of a conventional extrusion pelletizing apparatus.

DETAILED DSCRIPTION OF THE PREFERRED EMBODIMENTS

The present invention shall be explained below in detail with reference to the drawings.

Figure 1:
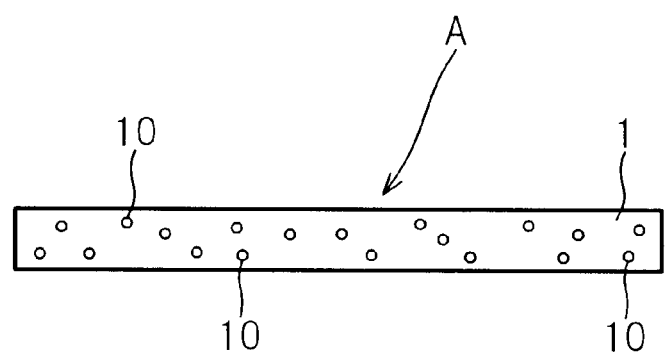
FIG. 1 is a cross section showing one example of the chewing gum composition of the present invention.
Figure 2:
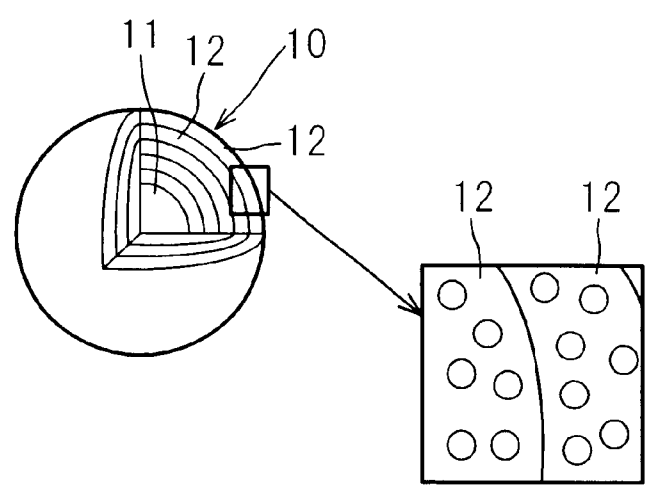
FIG. 2 is a partial cross section of a granular flavoring to be added to the chewing gum composition of the present invention.

FIG. 1 is a cross section of the chewing gum composition (plate gum) of the present invention; FIG. 2 is a partial cross section of a granular flavoring; and FIG. 3 is an explanatory drawing for explaining a growing mechanism of granules of the granular flavoring produced.

As shown in FIG. 1, the chewing gum composition (plate gum) (A) in the present invention comprises a chewing gum component 1 and a granular flavoring 10 contained therein.

The granular flavoring 10 is a granular flavoring obtained by a fluidized bed layering granulating method using a spray-drying type fluidized bed granulating apparatus which continuously produces spherical granules directly from a liquid raw material. As shown in FIG. 2, it has a flavoring nuclear particle 11 and is of a particle structure in which the above flavoring nuclear particle 11 is subjected to fluidized bed layering granulation to be made multilayer coating (12) with the flavoring particles.

Figure 3:
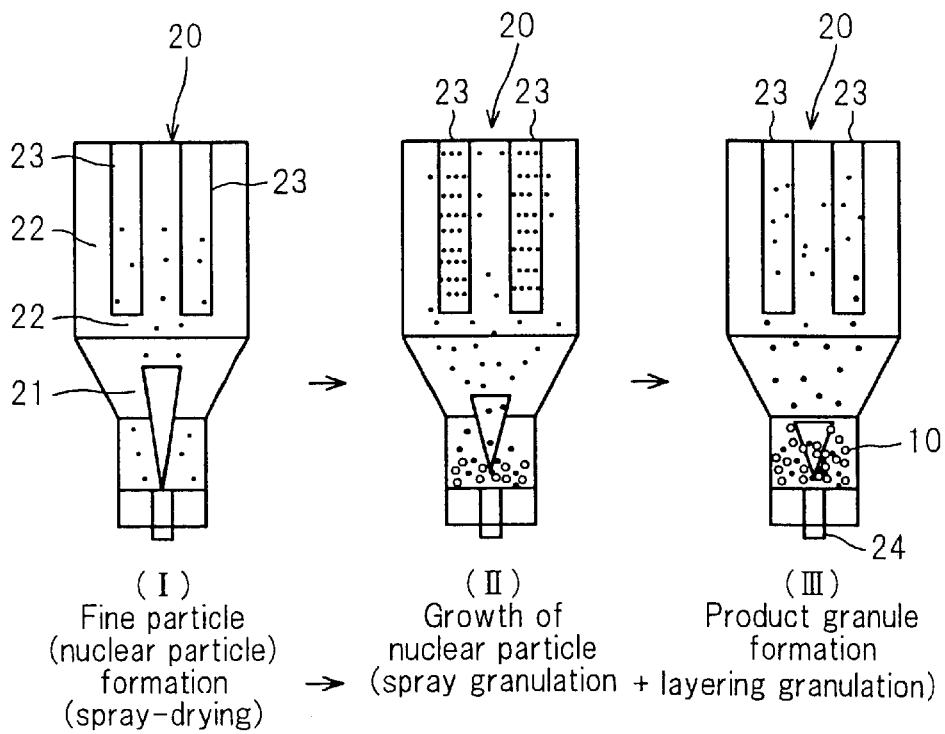
FIG. 3 is an explanatory drawing for explaining a production mechanism of the granular flavoring to be added to the chewing gum composition of the present invention.

This granular flavoring 10 is obtained by a fluidized bed layering granulating method using an apparatus which continuously produces spherical granules directly from a liquid raw material, for example, a spray-drying type fluidized bed granulating apparatus 20 shown in FIG. 3.

This granular flavoring 10 is obtained by the following growing mechanism.

In the spray-drying type fluidized bed granulating apparatus 20 in FIG. 3 (I), a liquid raw material which comprises a flavoring composition and is fed into a space tower (spray zone) 21 into which a high temperature air stream flows through a spray nozzle (not illustrated) is turned into fine particles in the course of ascending, dried in a moment to become fine particles (several μm to several ten μm) 22 and captured in a bag filter section 23 in an upper part. The particles are shaken down in this bag filter section 23 by periodically blowing (pulse jet back washing system) compressed air into the inside thereof. The fine particles fall down to the spray zone 21 in the lower part by inertia force and become flavoring nuclear particles there to be layered with the liquid raw material. The flavoring nuclear particles are captured again in the bag filter section 23 in the upper part while growing into particles with only layered solid of the flavoring component.

That is, the liquid raw material comprising the flavoring composition is consumed for producing the fine flavoring nuclear particles (shown by the symbol 11 in FIG. 2) by spray-drying and layering the flavoring nuclear particles once produced. The particles achieve the growth thereof with continuation of these phenomena, and when the particle diameter thereof grows to the extent that a descending velocity of the particles comes to the terminal velocity or less relative to an ascending velocity of a high temperature air stream, the particles come to form a fluidized bed in a lower part of the apparatus [FIG. 3 (II)]. Then, the liquid raw material comprising the flavoring composition which is fed by spraying through the spray nozzle at a high pressure is used for layering of the grown particles in the fluidized bed. On the other hand, a part of the liquid raw material blows through the particle bed to form fine flavoring nuclear particles [FIG. 3 (III)].

The granular flavoring (granular product) 10 which has grown based on a granulating mechanism in which a spray-drying principle is combined with a fluidized bed layering principle has such a structure as shown in FIG. 2.

The granular product is discharged in a lump through a discharge port 24 in the central part of an air blow plate in the case of batch operation. In the case of continuous operation, the product is taken out continuously and quantitatively from the discharge port via a shielded discharge device (rotary valve and the like) at a rate which is equivalent to the rate of producing the particles from the time when a granule-holding amount in the fluidized bed reaches a prescribed amount [FIG. 3 (III)].

A granulating apparatus for producing the granular flavoring used in the present invention shall not specifically be restricted in a structure thereof as long as it is a spray-drying type fluidized bed granulating apparatus which is established for a fluidized bed layering granulating method and includes, for example, Agglomaster AGM-SD type (manufactured by Hosokawa Micron Corporation).

In this spray-drying type fluidized bed granulating apparatus, conventional drying (spray drying or vacuum drying), liquid addition (moisture controlling for granulation), granulation (fluidized bed or extrusion granulation), balling (roll balling) and finish drying (fluidized drying) can be carried out by a single apparatus (one process), and therefore the granular flavoring is obtained by an efficient and economical granulation drying system.

In the present invention, the granular flavoring which is obtained by the fluidized bed layering granulating method described above has to have a bulk density of 0.40 to 0.95 $g/cm^3$, preferably 0.50 to 0.90 $g/cm^3$ and more preferably 0.50 to 0.80 $g/cm^3$. The bulk density of the granular flavoring can be controlled primarily by maintaining the temperature of the fluidized bed described later at 60 to 120° C.

The bulk density of the granular flavoring which is controlled to 0.40 to 0.95 $g/cm^3$ is reflected mainly on a thickness of a multi-coating layer comprising the flavoring particle layers 12 having the flavoring nuclear particles described above.

The intended chewing gum composition which has excellent persistence in a flavor can be prepared only by controlling the bulk density of the granular flavoring to 0.40 to 0.95 $g/cm^3$, since such bulk density retards the flavor component from eluting in a mouth to reveal a strong flavor even after staying in a mouth for a long time. If the bulk density of the granular flavoring is less than 0.40 $g/cm^3$, the intended chewing gum composition having excellent persistence can not be obtained, and a significant difference in an effect from granules prepared by conventional techniques is not observed. On the other hand, the flavoring having a bulk density exceeding 0.95 $g/cm^3$ has a high possibility to be perceived as a foreign matter in a mouth and therefore is not preferred.

The bulk density is determined by means of an ABD-powder characteristic measuring meter (manufactured by Tsutsui Rikagaku Co., Ltd.) in the present invention.

A hardness of the powder flavoring in the present invention shall not specifically be restricted and is preferably 0.5 to 1.0 $gf/mm^2$, more preferably 0.5 to 0.8 $gf/mm^2$ in terms of a value measured by means of a hardness measuring meter (micro-compression tester MCTM-500 type manufactured by Shimadzu Corporation).

If the hardness is less than 0.5 $gf/mm^2$, a difference in an effect from granules prepared by conventional techniques tends to be reduced, and the flavoring having a hardness exceeding 1.0 $gf/mm^2$ has a high possibility to be perceived as a foreign matter in a mouth and therefore is not preferred.

Further, an average particle diameter of the granular flavoring in the present invention is preferably controlled to 50 to 1000 μm, more preferably 100 to 700 μm.

If the average particle diameter is less than 50 μm, intensity of the flavor revealed tends to be weakened, and the flavoring having an average particle diameter exceeding 1000 μm has a high possibility to be perceived as a foreign matter in a mouth and therefore is not preferred.

The average particle diameter in the present invention means one measured based on a sieving method using a JIS standard sieve.

A hardness and/or an average particle diameter of the granular flavoring described above can be controlled by a temperature of the fluidized bed, an air-blasting rate, a flow rate of a spraying solution and a flow rate and a pressure of spraying air as described later.

The flavoring composition which is the raw material for obtaining the granular flavoring used in the present invention shall not specifically be restricted as long as it comprises a perfume and/or a flavoring and is preferably composed of a perfume and/or a flavoring, water (purified water or ion-exchanged water), an emulsifier and saccharides.

Examples of the flavoring include essential oils such as peppermint oil, spearmint oil, orange oil, lemon oil, grapefruit oil, lime oil, lavender oil, jasmin oil, sage oil, laurel oil, cammomile oil, basil oil, caraway oil, cardamom oil, cinnamon oil, ginger oil, coriander oil, geranium oil, hyssop oil, orris oil, davana oil, elemi oil and osmanthus, spice extracts such as paprika oleoresin and vanilla extract, and synthetic perfumes such as 1-menthol, carvone, eugenol, isoeugenol, esters, ionone, vanillin, ethylvanillin and maltol and seasoning oils prepared by extracting flavors, which are obtained by processing animal and plant raw materials, with oils. They can be used alone or in combination of two or more kinds thereof.

Examples of the emulsifier include gum arabic, saccharose fatty acid esters, lecithin, polyglycerin fatty acid esters and quillaia saponin. They can be used alone or in combination of two or more kinds thereof.

Examples of the saccharides include monosaccharides such as glucose, fructose and galactose, disaccharides such as sucrose and maltose, and dextrin. They can be used alone or in combination of two or more kinds thereof.

Further, capable of being suitably added, if necessary, to the flavoring composition described above are natural and synthetic thickening agents such as tragacanth gum, xanthan gum and carboxymethyl cellulose, proteins such as gelatin and casein, and organic acids such as lactic acid, citric acid, malic acid and tartaric acid.

The granular flavoring used in the present invention is, as described above, obtained by the fluidized bed layering granulating method using the spray-drying type fluidized bed granulating apparatus which continuously produces spherical granules directly from the flavoring composition which is a liquid raw material. The liquid raw material which is the flavoring composition is sprayed into the bed of the flavoring nuclear particles fluidized by heated air and the temperature of the fluidized bed is maintained at 40 to 100° C., whereby the granular flavoring can be produced by one process.

The temperature of the fluidized bed is controlled preferably to 50 to 90° C., more preferably 55 to 85° C.

If the temperature of the fluidized bed is lower than 40° C., moisture is delayed in drying, so that the production time is extended. On the other hand, a temperature exceeding 100° C. brings about volatilization and thermal deterioration of the flavor components and therefore tends to make it difficult to obtain a chewing gum composition containing the granular flavoring having the intended excellent quality. Accordingly, such temperatures are not preferred.

As described above, the said flavoring nuclear particles are obtained by emulsifying the flavoring composition and spray-drying it, but an emulsion of the flavoring composition can be sprayed into the fluidized bed to thereby form directly them as well in the fluidized bed.

The chewing gum composition in the present invention contains the granular flavoring described above in a proportion of 0.01 to 5% by weight, preferably 0.05 to 3% by weight and more preferably 0.1 to 1% by weight based on the total amount of the chewing gum composition.

If a content of the granular flavoring is less than 0.01% by weight, the intended chewing gum having excellent persistence in a flavor is not obtained. On the other hand, a content exceeding 5% by weight exerts an adverse effect on the touch and the processing aptitude of the chewing gum composition and therefore is not preferred.

The chewing gum composition of the present invention can be produced by blending the granular flavoring having a bulk density falling in the range described above with the chewing gum components by a conventional method, and the resulting chewing gum composition is excellent in a chewing feeling and persistence of a flavor.

It is the essential point of the chewing gum composition thus constituted in the present invention that it contains the granular flavoring having a bulk density falling in the range described above, and the other components shall not specifically be restricted. Various chewing gum components usually blended can be used for the chewing gum components, and capable of being blended suitably in combination are, for example, gum bases such as natural chicle and polyvinyl acetate, palatinose, reduced palatinose, maltitol, glucose, sugar, reduced maltose syrup, xylitol, aspartame, a brightening agent, a softening agent, a flavoring and a colorant.

In the present invention, the form of the chewing gum composition shall not specifically be restricted, and chewing gum of, for example, a chunk type, a particle type or a plate type can be prepared.

Further, as long as the effects of the present invention are not damaged, capable of being added to the chewing gum composition of the present invention are, in addition to the granular flavoring described above, powder or granules of calcium compounds which provide a tooth-brushing effect, substances having a dental plaque formation-inhibiting effect (for example, mutastein), dental plaque-decomposing enzymes (for example, dextranase) and immuno globulin York: (IgY) inhibiting dental caries bacteria, whereby the tooth-brushing effect can further be displayed.

The chewing gum composition thus constituted in the present invention contains the granular flavoring having a bulk density of 0.40 to 0.95 g/cm$^3$, which is obtained by the fluidized bed layering granulating method using the spray-drying type fluidized bed granulating apparatus which can continuously produce spherical granules directly from the liquid raw material (flavoring composition), and therefore it is such excellent in persistence that the flavor component is delayed in elution and reveals the strong flavor even after staying in a mouth for long time.

Even a granular flavoring obtained by the fluidized bed layering granulating method described above can not achieve the effects of the present invention if the bulk density deviates from the range of 0.40 to 0.95 g/cm$^3$. Also, a granular flavoring obtained by a conventional spray-drying method or by means of an apparatus (fluidized bed agglomeration-granulating apparatus) provided with a function of fluidized bed granulation in a spray-drying apparatus or a wet stirring-granulating apparatus can not achieve the effects of the present invention even if it has a bulk density of 0.40 to 0.95 g/cm$^3$ (these points shall be explained in further details in examples and comparative examples which shall be described later).

EXAMPLES

Next, the present invention shall more specifically be explained with reference to examples and comparative examples, but the present invention shall not be restricted to these examples.

Example 1

A mixture comprising 150 g of water (purified water), 30 g of gum arabic, 35 of dextrin (DE10) and 10 g of gelatin (molecular weight: about 150000) was heated up to 80° C. to thereby dissolve and sterilize them and then cooled down to 40° C.

Added thereto was 25 g of peppermint oil, and CLEAR MIX (manufactured by M Technique Co., Ltd.) was used to emulsify them at 18000 rpm.

The resulting emulsion was subjected to fluidized bed layering granulation by means of Agglomaster AGM-SD (manufactured by Hosokawa Micron Corporation) at an air blasting temperature of 105° C. to obtain 85 g of peppermint granules after sieving. These peppermint granules were designated as A.

Peppermint granules A had an average particle diameter of 100 to 800 μm, a bulk density of 0.75 g/cm$^3$ and a hardness of 0.69 gf/mm$^2$.

Peppermint granules A were used to prepare a chewing gum composition according to the recipe shown in the following Table 1.

Comparative Example 1

A mixture comprising 150 g of water (purified water), 30 g of gum arabic, 35 g of dextrin (DE10) and 10 g of gelatin (molecular weight: about 150000) was heated up to 80° C. to thereby dissolve and sterilize them and then cooled down to 40° C.

Added thereto was 25 g of peppermint oil, and CLEAR MIX (manufactured by M Technique Co., Ltd.) was used to emulsify them at 18000 rpm.

The resulting emulsion was spray-dried at an air blasting temperature of 150° C. and an air discharging temperature of 80° C. by means of a spray dryer (manufactured by Ohkawara Kakohki Co., Ltd.) to obtain 90 g of peppermint powder after sieving. This peppermint powder was designated as B.

This peppermint powder B had an average particle diameter of 50 to 150 μm, a bulk density of 0.40 g/cm$^3$ and a hardness of 0.32 gf/mm$^2$.

This peppermint powder B was used to prepare a chewing gum composition according to the recipe shown in the following Table 1.

Comparative Example 2

The peppermint powder B of 300 g obtained in Comparative Example 1 described above was subjected to fluidized bed granulation with 100 g of a guar gum aqueous solution adjusted to 0.5% by weight at an air blasting temperature of 70° C. by means of a flow coater (manufactured by Uni-Glatt Ag.) to obtain 280 g of peppermint granules. These peppermint granules were designated as C.

Peppermint granules C had an average particle diameter of 100 to 800 μm, a bulk density of 0.25 g/cm$^3$ and a hardness of 0.15 gf/mm$^2$.

Peppermint granules C were used to prepare a chewing gum composition according to the recipe shown in the following Table 1.

Comparative Example 3

The peppermint powder B of 300 g obtained in Comparative Example 1 described above was subjected to stirring-rolling granulation with an aqueous solution which comprisies 50 g of water (purified water), 10 g of gum arabic and 10 g of dextrin (DE10) by means of a high-speed mixer (manufactured by Fukae Powtec Corpration) and then dried at an air blasting temperature of 70° C. by means of a flow coater (manufactured by Uni-Glatt Ag.) to obtain 240 g of peppermint granules. These peppermint granules were designated as D.

Peppermint granules D had an average particle diameter of 100 to 800 μm, a bulk density of 0.30 g/cm$^3$ and a hardness of 0.43 gf/mm$^2$.

Peppermint granules D were used to prepare a chewing gum composition according to the recipe shown in the following Table 1.

Test Example 1

Plate gums using the peppermint powder or granules obtained in Example 1 and Comparative Examples 1 to 3 were prepared according to the recipe shown in Table 1 to carry out flavor evaluation according to the following method.

First, a gum base, sugar, glucose and a corn syrup were blended, and the peppermint powder or granules A to D produced above were added thereto. They were admixed by a conventional method at about 50° C. by means of a high shearing type mixer and spread-molded by means of a roller after cooling down to prepare the plate gums in Example 1 and Comparative Examples 1 to 3 having a weight of 3 g/plate, respectively.

These plate gums were subjected to sensory evaluation of a flavor by 10 professional panelers.

Intensity of the flavor was evaluated at 30 seconds, 90 seconds and 180 seconds after starting chewing with ranking into seven stages. The results thereof are shown in the following Table 2.

TABLE 1

| Blend recipe of peppermint-flavored plate gum (blend unit: g) | | | | |
|---|---|---|---|---|
| | Example | Comparative Example | | |
| Raw materials | 1 | 1 | 2 | 3 |
| Gum base | 100 | 100 | 100 | 100 |
| Sugar | 250 | 250 | 250 | 250 |
| Glucose | 40 | 40 | 40 | 40 |
| Corn syrup (Bx. 85) | 60 | 60 | 60 | 60 |
| A | 4.5 | | | |
| B | | 4.5 | | |
| C | | | 4.5 | |
| D | | | | 4.5 |

TABLE 2

| | After 30 seconds | After 90 seconds | After 180 seconds |
|---|---|---|---|
| Example 1 | 5.0 | 6.1 | 4.9 |
| Comparative Example 1 | 5.2 | 3.3 | 1.0 |
| Comparative Example 2 | 5.3 | 4.5 | 1.9 |
| Comparative Example 3 | 5.5 | 4.7 | 2.8 |

As apparent from the results shown in Table 1 and Table 2 described above, it has been found that the plate gum of the present invention prepared in Example 1 is very excellent in persistence of the flavor as compared with the plate gums prepared by conventional techniques in Comparative Examples 1 to 3

Test Example 2

The plate gums prepared in Test Example 1 described above were subjected to sensory evaluation of a flavor by 10 professional panelers in the following manner.

Intensity of the flavor was evaluated at 0 second, 15 seconds, 30 seconds, 60 seconds, 90 seconds, 120 seconds, 150 seconds and 180 seconds after starting chewing with ranking into five stages.

Figure 4:
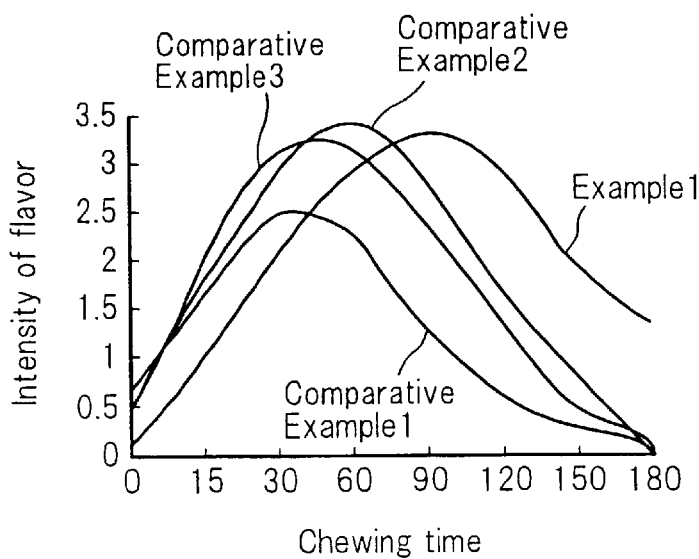
FIG. 4 is a characteristic drawing showing a relation between a chewing time (second) of a plate gum and intensity of a flavor in the examples and the comparative examples.

The results [chewing time (second) and intensity of flavor] obtained in this test example are shown in FIG. 4.

As shown in FIG. 4, it has been found that the plate gum using the flavoring of the present invention in Example 1 is excellent in persistence of the flavor as compared with the plate gum using the flavoring of a spray-dried product in Comparative Example 1, the plate gum using the flavoring of a fluidized bed granulation product in Comparative Example 2 and the plate gum using the flavoring of a wet granulation product in Comparative Example 3.

Test Example 3

The plate gums prepared in Test Example 1 described above were divided evenly into 12 pieces each having the size of 10 mm square, and 24 pieces out of them were fixed on a filter so that they were not superposed each other. They were subjected to elution with shaking in warm water of 40° C. for 5 minutes, 15 minutes, 30 minutes, 60 minutes and 120 minutes.

The flavor components were extracted again from the eluted solutions by a steam distillation method and subjected to quantitative analysis by means of a gas chromatography (manufactured by Hewlett-Packard Company). A relation between the elution time and the elution rate were determined from the resulting eluted amount.

The results [elution time (minutes) and elution rate (%)] obtained in this test example are shown in FIG. 5.

As shown in FIG. 5, it has been found that the plate gum using the flavoring of the present invention in Example 1 is excellent in persistence of the flavor as compared with the plate gum using the flavoring of a spray-dried product in Comparative Example 1 and the plate gum using the flavoring of a wet granulation product in Comparative Example 3.

What is claimed is:

1. A chewing gum composition containing a granular flavoring, shaving a bulk density of 0.40 to 0.95 g/cm$^3$ a hardness of 0.5 to 1.0 gf/mm2 and an average particle diameter of 50 to 1000 um obtained by a fluidized bed layering granulating method using a spray-drying type fluidized bed granulating apparatus which continuously produces spherical granules directly from a liquid raw material.

2. The chewing gum composition as described in claim 1, wherein the granular flavoring is contained in a proportion of 0.01 to 5% by weight based on the total amount of the chewing gum composition.

* * * * *